United States Patent
Ojanpera (10) Patent No.: US 8,909,661 B2
(45) Date of Patent: Dec. 9, 2014

(54) METHODS AND APPARATUSES FOR TIME-STAMPING MEDIA FOR MULTI-USER CONTENT RENDERING

(71) Applicant: Nokia Corporation, Espoo (FI)

(72) Inventor: Juha Ojanpera, Nokia (FI)

(73) Assignee: Nokia Corporation, Espoo (FI)

( * ) Notice: Subject to any disclaimer, the term of this patent is extended or adjusted under 35 U.S.C. 154(b) by 84 days.

(21) Appl. No.: 13/622,524

(22) Filed: Sep. 19, 2012

(65) Prior Publication Data

US 2014/0081987 A1   Mar. 20, 2014

(51) Int. Cl.
*G06F 17/30* (2006.01)

(52) U.S. Cl.
CPC .................... *G06F 17/3053* (2013.01)
USPC ............ 707/758; 707/690; 707/748; 713/178

(58) Field of Classification Search
CPC .............. G06F 11/14; G06F 17/30283; G06F 17/30867; G06F 7/00; G06F 1/14; G06F 2221/2151; G06F 17/30353
USPC .......... 707/690, 748, 758, 822; 713/178, 690, 713/748, 758, 822
See application file for complete search history.

(56) References Cited

U.S. PATENT DOCUMENTS

| | | | |
|---|---|---|---|
| 6,580,791 B1* | 6/2003 | Porter | 379/220.01 |
| 7,454,402 B2* | 11/2008 | Spencer et al. | 707/999.202 |
| 8,713,435 B2* | 4/2014 | Guan et al. | 715/703 |
| 2006/0010072 A1* | 1/2006 | Eisen | 705/44 |
| 2007/0239606 A1* | 10/2007 | Eisen | 705/51 |
| 2008/0137756 A1 | 6/2008 | Scherlis et al. | |
| 2010/0042741 A1 | 2/2010 | Priddle et al. | |
| 2012/0054623 A1* | 3/2012 | Guan et al. | 715/733 |
| 2012/0064891 A1* | 3/2012 | Wijayanathan et al. | 455/435.1 |
| 2012/0165100 A1* | 6/2012 | Lalancette et al. | 463/42 |
| 2013/0304694 A1* | 11/2013 | Barreto et al. | 707/608 |

OTHER PUBLICATIONS

Bonham, S. et al., *Quake: An Example Multi-User Network Application—Problems and Solutions in Distributed Interactive Simulations*, May 31, 2000, pp. 1-10 [online] [retrieved Oct. 3, 2012]. Retrieved from the Internet: <URL:http://www1ff8w.runequake.com/hoh/Quake.pdf>.

* cited by examiner

*Primary Examiner* — Phong Nguyen
(74) *Attorney, Agent, or Firm* — Alston & Bird LLP (57) ABSTRACT

A method, apparatus, and computer program product are provided in order to capture and share audio and/or video content in a multi-user environment. In the context of a method, audio and/or video content is captured and selected to be uploaded to be shared with other users. The method may assign and verify global timestamps for captured content and cause the content and verified timestamps to be uploaded to a multi-user content server. The method uses the verified timestamps to synchronize multi-user content to a common timeline in an efficient manner, allowing for rendering of content that is to be shared with other end users. A corresponding apparatus and a computer program product are also provided.

15 Claims, 7 Drawing Sheets

METHODS AND APPARATUSES FOR TIME-STAMPING MEDIA FOR MULTI-USER CONTENT RENDERING

TECHNOLOGICAL FIELD

An example embodiment of the present invention relates generally to multi-user content and, more particularly, to the capturing and rendering of content in a multi-user environment.

BACKGROUND

In multi-user content sharing, users located within an environment may each capture audio and/or visual content of events occurring within the environment with their individual devices. These users may then upload the captured audio/video content to a multi-user content server, where it may be shared with other users. The capturing devices may be arbitrarily positioned throughout the event space to capture the event. Location data and/or positioning data of the devices may be captured along with the audio/visual content and uploaded to the multi-user content server. The multi-user content server may use the location and/or position data to provide various listening and/or viewing points to a user for selection when downloading/streaming the captured content. The multi-user content server may then combine the uploaded content from the plurality of devices to provide rendered event content to users. In this regard, a user may select a particular listening/viewing point for the captured event and the multi-user content server may render mixed content from the uploaded content to reconstruct the event space.

To provide multi-user rendered content for sharing with other users, content from multiple users must first be uploaded to the multi-user content server. Once uploaded, the content corresponding to an event from multiple users must be synchronized to allow for rendering of the event content for end users. However, the content may generally be captured by a plurality of devices in an unsynchronized manner, that is, there may be no external synchronization provided to the plurality of devices to maintain synchronization for the content capture at the plurality of devices. For example, the plurality of users may generally each independently capture and upload content corresponding to an event using independent devices. To provide a positive user experience of the rendered multi-user content (e.g. to provide high quality rendered content to the end user), advanced processing needs to be applied to the independently captured and uploaded content. When synchronization information is not available for the uploaded content, the computational complexity of aligning the uploaded content is increased, and as the number of contributing users increases the problem becomes even worse.

BRIEF SUMMARY

A method, apparatus and computer program product are therefore provided according to an example embodiment of the present invention in order to capture and share audio and/or video content in a multi-user environment. In this regard, the method, apparatus and computer program product of an example embodiment may assign and verify timestamps for captured content, such as with a mobile device, and cause the content and verified timestamps to be uploaded to a multi-user content server. The verified timestamps may then be used to synchronize multi-user content to a common timeline in an efficient manner, allowing improved rendering of content that is to be shared with other end users.

The method, apparatus and computer program product of another example embodiment may receive and store time information from neighboring devices and attach the stored time and device information to captured content, such as with a mobile device, and cause the content, with the attached information, to be uploaded to a multi-user content server. The stored information may then be used to synchronize multi-user content to a common timeline.

In one embodiment, a method is provided that at least includes determining captured content to be shared in a multi-user environment; determining a current universal timestamp; and assigning a calculated timestamp to the captured content, wherein the calculated timestamp is based on the current universal timestamp, a current local timestamp, and a start timestamp of the captured content. The method of this embodiment also includes locating one or more reference content items, each having verified timestamps and verifying the calculated timestamp is valid based on the one or more located reference content items. The method of this embodiment also includes causing captured content data to be transmitted, wherein if the calculated timestamp is verified the captured content data comprises the captured content and the verified calculated timestamp, and wherein the captured content data otherwise comprises the captured content.

In one embodiment, the current universal timestamp may be based on a Network Time Protocol signal or a Global Positioning System signal. In one embodiment, assigning a calculated timestamp comprises determining a difference between the current universal timestamp and the current local timestamp and adding said difference to the start timestamp assigned to the content during capturing.

In some embodiments, locating one or more reference content items may further comprise searching for reference content items captured within a specified time window around a start timestamp of the captured content. In one embodiment, verifying the calculated timestamp may be based on up to a determined number of located reference content items.

The method of some embodiments may also include wherein verifying the calculated timestamp may further comprise calculating a first set of difference values between the calculated timestamp of the determined captured content and of the one or more reference content item verified timestamps; calculating a set of second difference values between the start timestamp of the determined captured content and the one or more reference content item start timestamps; calculating a third set of values comprising absolute values of each of a set of difference values between the set of first difference values and the set of second difference values; and determining that none of the third set of values exceeds a threshold parameter. The method of this embodiment may also include wherein the captured content data further comprises an indication of the start timestamp deviation for the captured content.

The method of one embodiment may include receiving content data and determining if the received content data contains verified timestamps. The method may further include generating a common timeline using the verified timestamps and aligning the received content to the common timeline.

In this embodiment, the method may further comprise wherein the aligning the received content to the common timeline further comprises excluding received content that does not overlap in time or where the overlap duration is minimal. The method of this embodiment may also comprise wherein aligning the received content to the common timeline further comprises limiting a time-alignment window.

In another embodiment, an apparatus is provided that includes at least one processor and at least one memory including computer program instructions with the at least one memory and the computer program instructions configured to, with the at least one processor, cause the apparatus at least to determine captured content to be shared in a multi-user environment. The at least one memory and the computer program instructions of this embodiment are also configured to, with the at least one processor, cause the apparatus to determine a current universal timestamp and assign a calculated timestamp to the captured content, wherein the calculated timestamp is based on the current universal timestamp, a current local timestamp, and a start timestamp of the captured content. The at least one memory and the computer program instructions are also configured to, with the at least one processor, cause the apparatus of this embodiment to locate one or more reference content items, each having verified timestamps; verify the calculated timestamp is valid based on the one or more located reference content items; and cause captured content data to be transmitted, wherein if the calculated timestamp is verified the captured content data comprises the captured content and the verified calculated timestamp, and wherein the captured content data otherwise comprises the captured content.

In another embodiment, an apparatus is provided that includes at least one processor and at least one memory including computer program instructions with the at least one memory and the computer program instructions configured to, with the at least one processor, cause the apparatus at least to receive content data and determine if the received content data contains verified timestamps. The at least one memory and the computer program instructions may be further configured to, with the at least one processor, cause the apparatus to generate a common timeline using the verified timestamps and align the received content to the common timeline.

In a further embodiment, a computer program product is provided that includes at least one non-transitory computer-readable storage medium bearing computer program instructions embodied therein for use with a computer with the computer program instructions including program instructions configured to determine captured content to be shared in a multi-user environment. The computer program instructions of this embodiment also include program instructions configured to determine a current universal timestamp and assign a calculated timestamp to the captured content, wherein the calculated timestamp is based on the current universal timestamp, a current local timestamp, and a start timestamp of the captured content. The computer program instructions of this embodiment also include program instructions configured to locate one or more reference content items, each having verified timestamps; verify the calculated timestamp is valid based on the one or more located reference content items; and cause captured content data to be transmitted, wherein if the calculated timestamp is verified the captured content data comprises the captured content and the verified calculated timestamp, and wherein the captured content data otherwise comprises the captured content.

In another embodiment, a computer program product is provided that includes at least one non-transitory computer-readable storage medium bearing computer program instructions embodied therein for use with a computer with the computer program instructions including program instructions configured to receive content data and determine if the received content data contains verified timestamps. The computer program instructions may be further configured to generate a common timeline using the verified timestamps and align the received content to the common timeline.

In another embodiment, an apparatus is provided that includes at least means for determining captured content to be shared in a multi-user environment; means for determining a current universal timestamp; and means for assigning a calculated timestamp to the captured content, wherein the calculated timestamp is based on the current universal timestamp, a current local timestamp, and a start timestamp of the captured content. The apparatus of this embodiment also includes means for locating one or more reference content items, each having verified timestamps; means for verifying the calculated timestamp is valid based on the one or more located reference content items; and means for causing captured content data to be transmitted, wherein if the calculated timestamp is verified the captured content data comprises the captured content and the verified calculated timestamp, and wherein the captured content data otherwise comprises the captured content.

In another embodiment, an apparatus is provided that includes at least means for receiving content data and means determining if the received content data contains verified timestamps. The apparatus of this embodiment further includes means for generating a common timeline using the verified timestamps and means for aligning the received content to the common timeline.

In one embodiment, a method is provided that at least includes causing content capture to be started in a multi-user environment; broadcasting a device identifier and a local timestamp; and listening for and receiving transmissions including a device identifier and a timestamp. The method of this embodiment also includes identifying whether the received device identifier already exists in stored data, and if the device identifier does not already exist in stored data, adding the device ID and a time difference to the stored data. The method of this embodiment also includes attaching the stored data to the captured content upon completion of the content capturing and causing the captured content to be uploaded. In some embodiments, the method may include assigning a global timestamp to the captured content before causing the content to be uploaded.

In some embodiments, multiple transmissions of a received device identifier and timestamp may be received and added to the stored data and an average time difference may be attached to the captured content. In some embodiments, the method may include causing the stored data to be transmitted.

The method of one embodiment may include receiving content data, determining if the received content data contains time difference data, and if the content contains time difference data, determining if the content contains at least one device identifier that already exists in a difference timescale timeline. The method may further include aligning the received content to the difference timescale timeline using the time difference data as at least part of the alignment criteria. In this embodiment, the method may further comprise determining whether the received content contains a global timestamp, and if the received content contains a global timestamp, merging a difference timescale timeline and a global timescale timeline.

In this embodiment, the method may further comprise, if the received content does not contain time difference data, determining whether the received content contains a global timestamp, and if the content contains a global timestamp, aligning the received content to a global timescale timeline using the global timestamp as at least part of the alignment criteria.

In this embodiment, the method may further comprise, if the received content does not contain time difference data or a global timestamp, aligning the received content to a common timeline in a blind manner, such as by analyzing the signal data.

In another embodiment, an apparatus is provided that includes at least one processor and at least one memory including computer program instructions with the at least one memory and the computer program instructions configured to, with the at least one processor, cause the apparatus at least to cause content capture to be started in a multi-user environment; broadcast a device identifier and a local timestamp; and listen for and receive transmissions including a device identifier and a timestamp. The at least one memory and the computer program instructions are also configured to, with the at least one processor, cause the apparatus of this embodiment to identify whether the received device identifier already exists in stored data, and if the device identifier does not already exist in stored data, add the device ID and a time difference to the stored data. The at least one memory and the computer program instructions are also configured to, with the at least one processor, cause the apparatus of this embodiment to attach the stored data to the captured content upon completion of the content capturing and cause the captured content to be uploaded. In some embodiments, the at least one memory and the computer program instructions may also be configured to, with the at least one processor, cause the apparatus to assign a global timestamp to the captured content before causing the content to be uploaded.

In some embodiments, multiple transmissions of a received device identifier and timestamp may be received and added to the stored data and an average time difference may be attached to the captured content. In some embodiments, the at least one memory and the computer program instructions may also be configured to, with the at least one processor, cause the apparatus to cause the stored data to be transmitted.

In another embodiment, an apparatus is provided that includes at least one processor and at least one memory including computer program instructions with the at least one memory and the computer program instructions configured to, with the at least one processor, cause the apparatus at least to receive content data, determine if the received content data contains time difference data, and if the content contains time difference data, determine if the content contains at least one device identifier that already exists in a difference timescale timeline. The at least one memory and the computer program instructions are also configured to, with the at least one processor, cause the apparatus of this embodiment to align the received content to the difference timescale timeline using the time difference data as at least part of the alignment criteria. In this embodiment, the at least one memory and the computer program instructions may also be configured to, with the at least one processor, cause the apparatus to determine whether the received content contains a global timestamp, and if the received content contains a global timestamp, merge a difference timescale timeline and a global timescale timeline.

In this embodiment, the at least one memory and the computer program instructions may also be configured to, with the at least one processor, cause the apparatus to, if the received content does not contain time difference data, determine whether the received content contains a global timestamp, and if the content contains a global timestamp, align the received content to a global timescale timeline using the global timestamp as at least part of the alignment criteria.

In this embodiment, the at least one memory and the computer program instructions may also be configured to, with the at least one processor, cause the apparatus to, if the received content does not contain time difference data or a global timestamp, align the received content to a common timeline in a blind manner, such as by analyzing the signal data.

In a further embodiment, a computer program product is provided that includes at least one non-transitory computer-readable storage medium bearing computer program instructions embodied therein for use with a computer with the computer program instructions including program instructions configured to cause content capture to be started in a multi-user environment; broadcast a device identifier and a local timestamp; and listen for and receive transmissions including a device identifier and a timestamp. The computer program instructions of this embodiment also include program instructions configured to identify whether the received device identifier already exists in stored data, and if the device identifier does not already exist in stored data, add the device ID and a time difference to the stored data. The computer program instructions of this embodiment also include program instructions configured to attach the stored data to the captured content upon completion of the content capturing and cause the captured content to be uploaded. In some embodiments, the computer program instructions may also include program instructions configured to assign a global timestamp to the captured content before causing the content to be uploaded.

In some embodiments, multiple transmissions of a received device identifier and timestamp may be received and added to the stored data and an average time difference may be attached to the captured content. In some embodiments, the computer program instructions may also include program instructions configured to cause the stored data to be transmitted.

In another embodiment, a computer program product is provided that includes at least one non-transitory computer-readable storage medium bearing computer program instructions embodied therein for use with a computer with the computer program instructions including program instructions configured to receive content data, determine if the received content data contains time difference data, and if the content contains time difference data, determine if the content contains at least one device identifier that already exists in a difference timescale timeline. The computer program instructions of this embodiment also include program instructions configured to align the received content to the difference timescale timeline using the time difference data as at least part of the alignment criteria. In this embodiment, the computer program instructions may also include program instructions configured to determine whether the received content contains a global timestamp, and if the received content contains a global timestamp, merge a difference timescale timeline and a global timescale timeline.

In this embodiment, the computer program instructions may also include program instructions configured to, if the received content does not contain time difference data, determine whether the received content contains a global timestamp, and if the content contains a global timestamp, align the received content to a global timescale timeline using the global timestamp as at least part of the alignment criteria.

In this embodiment, the computer program instructions may also include program instructions configured to, if the received content does not contain time difference data or a global timestamp, align the received content to a common timeline in a blind manner, such as by analyzing the signal data.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention to assign timestamps to captured content in a multi-user environment to improve the rendering of content uploaded from a plurality of users. In this regard, a method, apparatus and computer program product of an example embodiment may assign and verify timestamps for captured content before uploading, where the verified timestamps may then be used to synchronize multi-user content to a common timeline in an efficient manner to improve the process of rendering content for end users.

A method, apparatus and computer program product are provided in accordance with another example embodiment of the present invention to receive and store time information from neighboring devices and attach the stored time and device information to captured content, such as with a mobile device, and cause the content, with the attached information, to be uploaded to a multi-user content server. The stored information may then be used to synchronize multi-user content to a common timeline.

To provide multi-user rendered content for sharing with other users, content from multiple users must first be uploaded to the multi-user content server. Once uploaded, the content corresponding to an event from multiple users must be synchronized to allow for rendering of the event content for end users. Some methods of synchronization for content include time-stamping the content during or at the end of capturing of the content, such as through the use of Global Positioning System (GPS) signals or Network Time Protocol (NTP) signals to create the timestamps. However, the use of GPS signals requires that the device include a GPS receiver and that the device be in a location where it can receive GPS signals, typically only outdoors. In a similar way, the use of NTP signals requires that the device have an active network connection, which is not always available, and further, timing errors may be introduced due to transmission delay of the network. As such, the content may be captured by a plurality of devices in an unsynchronized manner, that is, there may be no external synchronization available to the plurality of devices at the time of content capture to maintain synchronization for the content capture at the plurality of devices.

Figure 1:
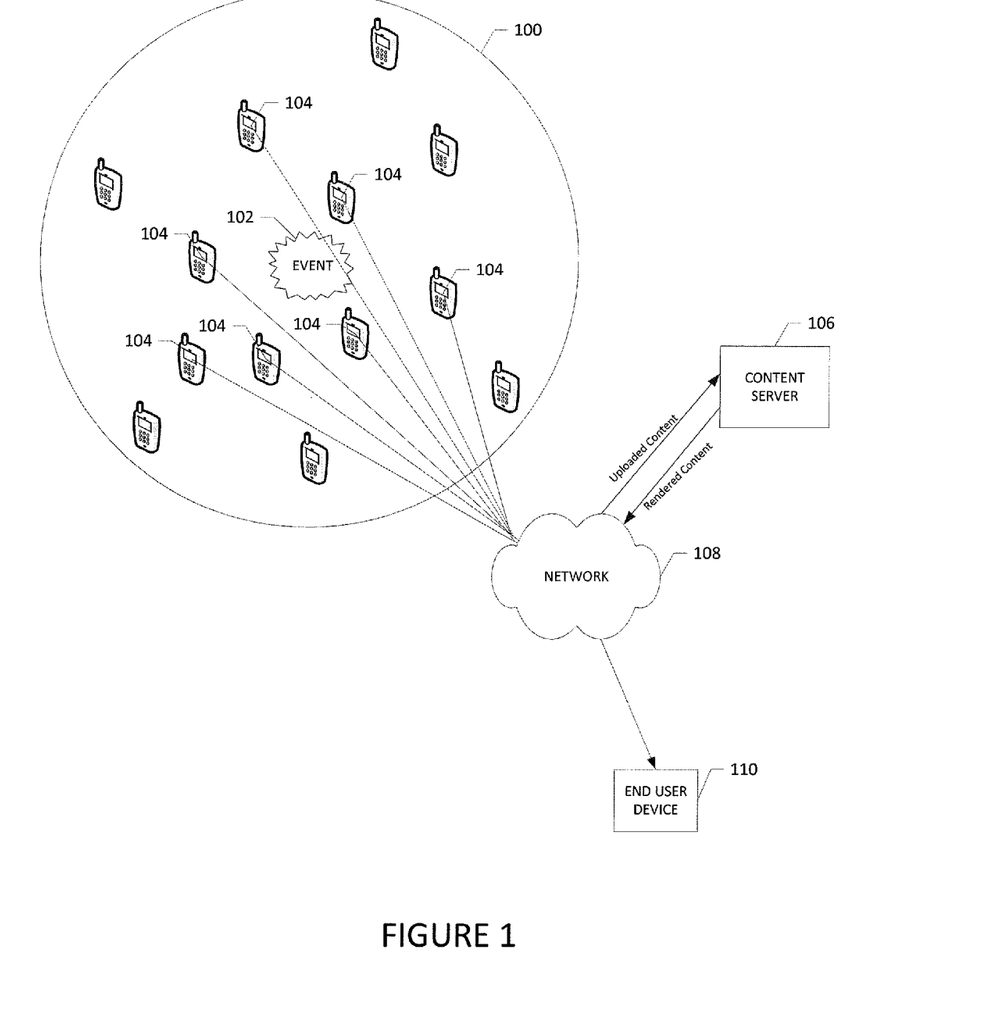
FIG. 1 is a recording environment where multi-user content may be captured and shared in accordance with an example embodiment of the present invention.

FIG. 1 illustrates a multi-user environment where an example embodiment of the present invention may be used. The environment 100 consists of a plurality of mobile devices 104 that are arbitrarily positioned within the environment to capture content of an event 102. The content may be, for example, audio, video, still images, or any combination of such. The mobile device 104 may be embodied as a variety of different mobile devices including as a mobile telephone, a personal digital assistant (PDA), a laptop computer, a tablet computer, a camera, a video recorder, or any of numerous other computation devices, content generation devices, content consumption devices or combinations thereof. Although described herein in conjunction with mobile devices, the environment may include one or more fixed or stationary devices, such as one or more fixed cameras, a desktop computer, or the like, in addition to or instead of the mobile devices.

The content captured by one of the plurality of mobile devices 104 may be uploaded immediately or may be stored and uploaded at a future time. The plurality of mobile devices 104 may also record timestamps for the content being captured, and such timestamps may be based on a local device time signal or on external signals, such as timing from Global Positioning System (GPS) signals or Network Time Protocol (NTP) signals. The plurality of mobile devices 104 may also capture position data corresponding to the location where the content is being captured, such as through the use of Global Positioning System (GPS) coordinates, Cellular Identification (Cell-ID), or Assisted GPS (A-GPS). The plurality of mobile devices 104 may also capture direction/orientation data corresponding to the recording direction/orientation, such as by using compass, accelerometer or gyroscope data. The captured content, e.g. audio, video, and/or still image data, from a mobile device 104 is then transmitted through network 108, such as to a multi-user content server 106. In this regard, network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 108 may include a cellular radio access network, an 802.11, 802.16, 802.20, and/or WiMax network. Further, the network 108 may include a public network, such as the Internet, a private network, such as an intranet, or combinations thereof.

The multi-user content server 106 receives the uploaded content from the plurality of mobile devices 104. The captured content may often be uploaded to the multi-user content server 106 at a much later time than the original capture. The multi-user content server 106 may combine the captured content from one or more mobile devices 104, such as one or more mobile devices that are in close proximity, to provide rendered content to be shared with end users. The end users may be users who uploaded content or other users who wish to receive rendered content from an event.

To provide rendered content, the multi-user content server 106 may first align the content uploaded from a plurality of users to allow generation of the rendered content using the best media segments from the plurality of users. However, a mobile device 104 may only have a local time source available when capturing content, so the content uploaded by the plurality of users may not be synchronized as each mobile device 104 has an independent timing source. To improve efficiency in aligning the uploaded content and rendering the content for end users, an embodiment of mobile device 104 may assign a new timestamp to the content that is to be uploaded by determining the current global time, identifying other content that was previously assigned a verified timestamp, and comparing the calculated and local timestamps of the content to be uploaded and the other identified content (with a verified timestamp) to determine if the local time can be mapped to the global time.

A further embodiment of mobile device 104 may broadcast a device identifier and local timestamp, receive and store device and time difference information from neighboring devices, attach the stored time difference and device information to captured content, and cause the content, with the attached information, to be uploaded to a multi-user content server.

After content from multiple users is available at the multi-user content server 106, the content may be rendered such that the downloaded/streamed content utilizes content from the different users in various ways. For example, the content may be rendered so as to provide the best media segments from multiple contributing users to provide the best end user experience of the multi-user rendered content. End users may be offered content that represents the multi-user content from various points of view that has been created in various manners, such as by equally sharing content from different users, selecting the best view as a function of time, maximizing or minimizing the viewing experience (that is, for each view select the view that is the most different from the different users or for each view select the view that is most similar from the different users), etc.

An end user may select content on the multi-user content server 106 that corresponds to a particular listening and/or viewing position at an event that the end user wishes to receive through end user device 110. The end user device 110 may be embodied as a variety of different mobile devices including as a mobile telephone, a personal digital assistant (PDA), a laptop computer, a tablet computer, a camera, a video recorder, an audio/video player, or any of numerous other computation devices, content generation devices, content consumption devices or combinations thereof. The end user device 110 may alternatively be embodied as a variety of different stationary or fixed computing devices, such as a desktop computer, a television, a game console, a multimedia device, or the like. Multi-user content server 106 may then render content corresponding to the selected listening/viewing position that the end user selected and cause the rendered content to be transmitted to end user device 110. Alternatively, if the proximity of the captured content is small, the multi-user content server 106 may provide only a single listening/viewing position to the end user.

The system of an embodiment of the present invention may include an apparatus 200 as generally described below in conjunction with FIG. 2 for performing one or more of the operations set forth by FIGS. 3 and 4 and also described below. In this regard, the apparatus may be embodied by the mobile device 104, end user device 110, or content server 106 of FIG. 1.

Figure 2:
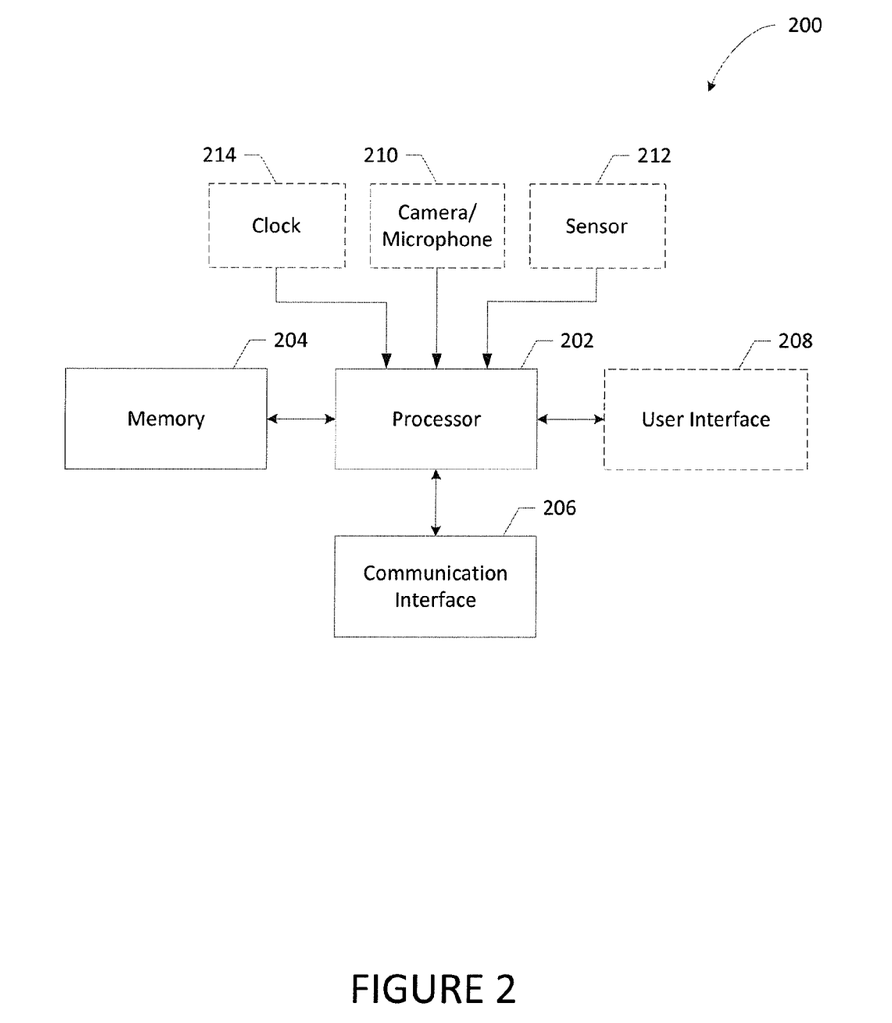
FIG. 2 is a block diagram of an apparatus that may be specifically configured in accordance with an example embodiment of the present invention.

It should also be noted that while FIG. 2 illustrates one example of a configuration of an apparatus 200 for capturing and rendering multi-user content, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 2, the apparatus 200 for capturing and rendering multi-user content in accordance with one example embodiment may include or otherwise be in communication with one or more of a processor 202, a memory 204, a communication interface 206, a user interface 208, a camera/microphone 210, a sensor 212, and a clock 214. In instances in which the apparatus is embodied by an end user device 110, the apparatus need not necessarily include a camera/microphone and a sensor and, in instances in which the apparatus is embodied by a content server 106, the apparatus need not necessarily include a user interface, a camera/microphone, and a sensor. As such, these components have been illustrated in dashed lines to indicate that not all instantiations of the apparatus include those components.

In some embodiments, the processor (and/or co-processors or any other processing circuitry assisting or otherwise associated with the processor) may be in communication with the memory device via a bus for passing information among components of the apparatus. The memory device may include, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor 202. Additionally or alternatively, the memory device could be configured to store instructions for execution by the processor.

In some embodiments, the apparatus 200 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 206 may be any means such as a device or circuitry embodied in either hardware or a combination of hardware and software that is configured to receive and/or transmit data from/to a network and/or any other device or module in communication with the apparatus 200, such as by supporting communications with the multi-user content server 106. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The apparatus 200 may include a user interface 208 that may, in turn, be in communication with the processor 202 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

In some example embodiments, such as instances in which the apparatus is embodied as a mobile device 104, the apparatus 200 may include an audio and video capturing element, such as a camera/microphone 210, video module and/or audio module, in communication with the processor 202. The audio/video capturing element may be any means for capturing an image, video and/or audio for storage, display or transmission. For example, in an example embodiment in which the audio/video capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image and/or video. Alternatively, the camera may include only the hardware needed to view an image, while a memory device 204 of the apparatus stores instructions for execution by the processor in the form of software necessary to create a digital image file from a captured image. In an example embodiment, the camera may further include a processing element such as a co-processor which assists the processor in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

As shown in FIG. 2, in instances in which the apparatus is embodied as a mobile device 104, the apparatus 200 may also include a timing source 214, such as a clock, to provide device timing data (e.g. local timestamps) for captured content.

In some example embodiments, such as instances in which the apparatus is embodied as a mobile device 104, the apparatus 200 may also include a sensor 212, such as a GPS receiver, a compass, an accelerometer, and/or a gyroscope that may be in communication with the processor 202 and may be configured to receive timing signals and to detect changes in position, motion and/or orientation of the apparatus.

The method, apparatus, and computer program product may now be described in conjunction with the operations illustrated in FIG. 3. In this regard, the apparatus 200 may include means, such as the processor 202, the camera/microphone 210, or the like, for capturing audio and/or video content of an event. See block 302 of FIG. 3. The apparatus 200 may also include means, such as the processor 202, the clock 214, or the like, for recording a local clock (device-based) timestamp, startTs, corresponding to the captured content.

At some time after capturing the content, for example, after the event has ended, after a few hours, after a few days, etc., it may be determined that the captured content will be uploaded, such as to the multi-user content server 106. As shown in block 304 of FIG. 3, the apparatus 200 may include means, such as the processor 202 or the like, for determining captured content that is to be uploaded to the multi-user content server 106. An apparatus may determine the captured content to be uploaded, for instance, through the use of settings programmed in advance of any capturing or by the selection of particular content by a user. For example, a user may provide an indication through user interface 208 that captured content is to be uploaded following completion of an operation to capture audio/video data, such as by setting a parameter through the user interface 208. Thus, the processor may determine that the captured content is to be uploaded. Alternatively, a user may review stored audio/video data (e.g. video/audio recordings of previous events) and provide an indication through user interface 208 that selected stored data (e.g. one or more video/audio recordings) is to be uploaded to the multi-user content server 106. As such, the processor may determine that the selected content is to be uploaded. Selecting content to be uploaded implies that the apparatus 200 has a network connection available for uploading the selected content. In a case where a network connection is not available at the moment the apparatus determines content is to be uploaded, the apparatus 200 waits until a network connection becomes available and then resumes the operations of FIG. 3.

Figure 3:
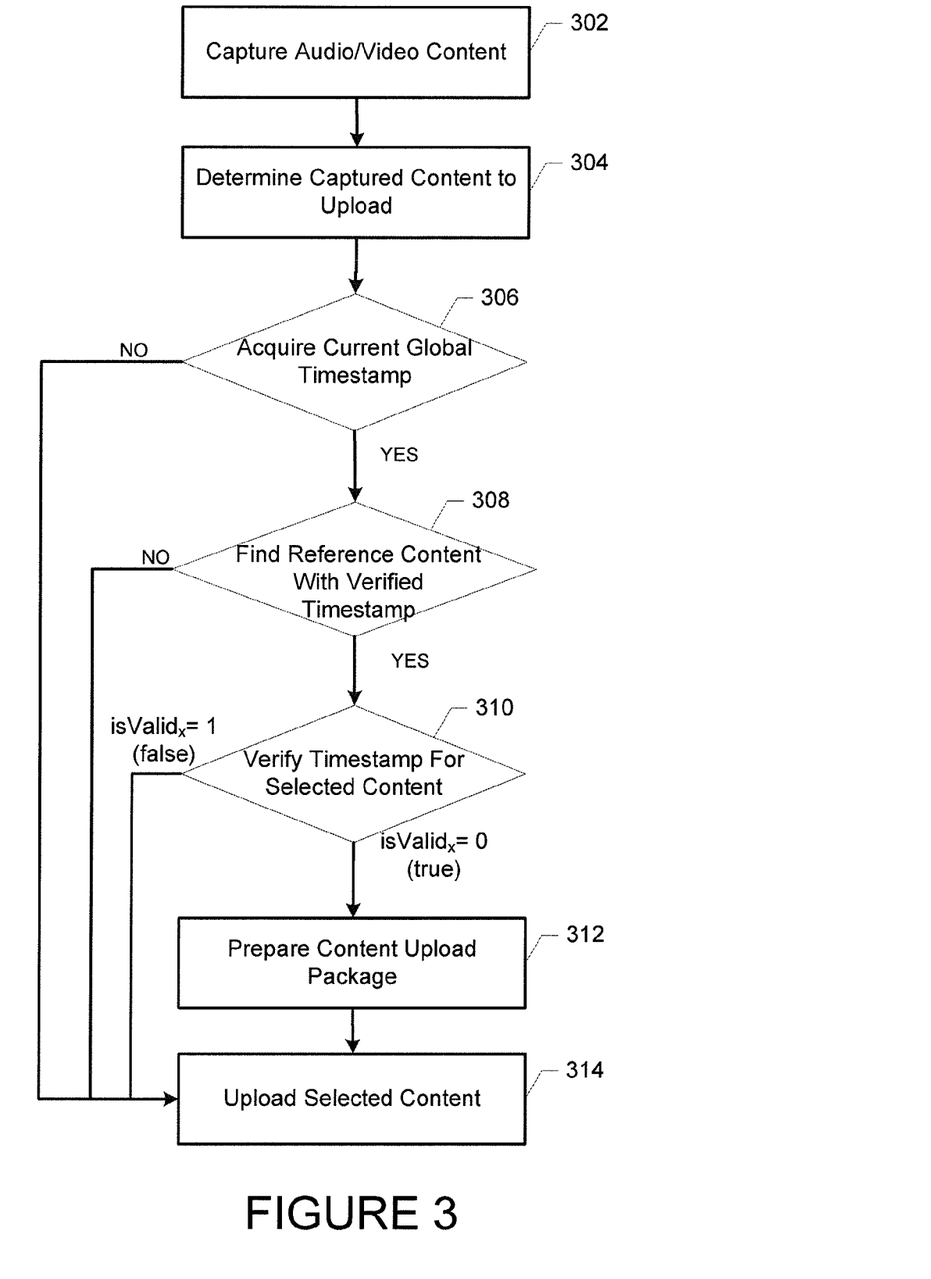
FIG. 3 is a flow chart illustrating operations performed by an apparatus of FIG. 2 that is specifically configured in accordance with an example embodiment of the present invention.

As shown in block 306 of FIG. 3, the apparatus 200 may also include means, such as the processor 202, sensor 212, or the like, for acquiring a current global timestamp, presentTs$_x$ where x is the content selected for uploading. The global timestamp may be based on an external timing source. For example, the global timestamp may be acquired by the apparatus 200 requesting a NTP time signal from the network. The global time stamp may also be acquired by using a GPS timing signal received by the apparatus 200. The apparatus 200 may also include means, such as the processor 202, or the like, for determining the clock skew for the apparatus 200. For example, the apparatus 200, using means such as the processor 202, may determine skew, using the equation skew$_x$=presentTs$_x$−localTs$_x$, where localTs$_x$ is the current local timestamp of the apparatus 200. The apparatus 200 may also include means, such as the processor 202, or the like, for calculating an acquired timestamp for the selected content x that is to be uploaded, such as by using the equation contentTs$_x$=startTs$_x$+skew$_x$.

If the apparatus 200 is not able to acquire a global timestamp, the content may be uploaded without an associated timestamp. See "NO" branch of block 306 and block 314 of FIG. 3. If the apparatus 200 does acquire a global timestamp, operation continues to block 308.

The apparatus 200 may also include means, such as the processor 202 or the like, for searching for previous captured content ("reference content") stored on the apparatus 200 that is marked with a verified timestamp, where contentTs$_i$=startTs$_i$+skew$_i$ is the verified timestamp for reference content i. The reference content may be used to verify that the timestamp that was acquired for the selected content is valid. See block 308 of FIG. 3.

For example, because time has passed since the content was actually captured, the acquired timestamp needs to be verified with respect to the start time of the selected content. In some instances, it is possible that the local clock of the apparatus 200 has drifted so much that the acquired timestamp cannot be verified for the selected content. It is also possible that a user has modified the time settings of the apparatus 200 since the content was captured which also affects the timestamp of the selected content.

If the apparatus 200 is not able to locate any reference content, the selected content may be uploaded without an associated timestamp. See "NO" branch of block 308 and block 314 of FIG. 3. If the apparatus 200 does locate one or more reference content, operation continues to block 310.

The apparatus 200 may also include means, such as the processor 202 or the like, for verifying the timestamp for the content selected to be uploaded. See block 310 of FIG. 3. The apparatus 200, using means such as the processor 202, may verify the timestamp according to:

$$isValid_x = \begin{cases} 1, & \text{any of } |a_i - b_i| > tThr, 0 \leq i < N \\ 0, & \text{otherwise} \end{cases} \quad (1)$$

where N is the number of reference content items found on the apparatus 200, where tThr is the threshold for the maximum allowed timestamp difference, where a$_i$ is the difference between the verified timestamp for the reference content i and the acquired timestamp for the selected content x, a$_i$=contentTs$_i$−contentTs$_x$, and where b$_i$ is the difference between the local start timestamp for the reference content i and the local start timestamp for the selected content x, b$_i$=startTs$_i$−startTs$_x$.

Equation (1) determines the absolute difference of the dual domain timestamps. On one hand the difference is calculated using content start times that are measured in the local device timebase (b$_i$) and on the other hand the difference is calculated from content timestamps which are mapped to global time (a$_i$). If the difference of these two differences exceeds the given threshold tThr, the timestamp for the selected content cannot be verified due to the mismatch in the dual domain timestamps. A threshold for the maximum allowed timestamp difference (tThr) is provided because some room for error must be tolerated as the global timestamp may contain some inaccuracies and the local clock in the apparatus 200 may drift over time.

If isValid$_x$ (Equation (1)) is equal to 0, the selected content x is marked as verified content and the timestamp contentTs$_x$ is assigned as its verified timestamp. If isValid$_x$ is equal to 1, the acquired timestamp, contentTs$_x$, cannot be validated and apparatus 200 may upload the selected content without an associated timestamp. See "isValid$_x$=1" branch of block 310 and block 314 of FIG. 3.

As shown in block 312 of FIG. 3, the apparatus 200 may also include means, such as the processor 202, or the like, to generate an upload package for the selected content. For example, the apparatus 200 may generate an upload package that comprises the selected content, content x, the verified timestamp, contentTs$_x$, and a value for the deviation in start time, cDiff$_x$, where cDiff$_x$=max{|a$_i$−b$_i$|, 0≤i<N}.

As shown in block 314 of FIG. 3, the apparatus 200 may also include means, such as the processor 202, or the like, for causing the upload of selected content, such as to multi-user content server 106. The upload may consist of the generated upload package if the content timestamp was verified to be valid, and alternatively, the upload may consist of just the selected content if the content timestamp cannot be verified, if apparatus 200 is not able to acquire a global timestamp, or if apparatus 200 is not able to locate any reference content.

In some embodiments, the number of reference content items that may be used for the verification may be limited, for example, selecting up to ten different reference content items. In some embodiments, the apparatus 200 only searches for reference content from a time period that does not exceed a certain time limit, for example, only reference content captured up to two hours before or after the start time of the selected content may be used.

Figure 4:
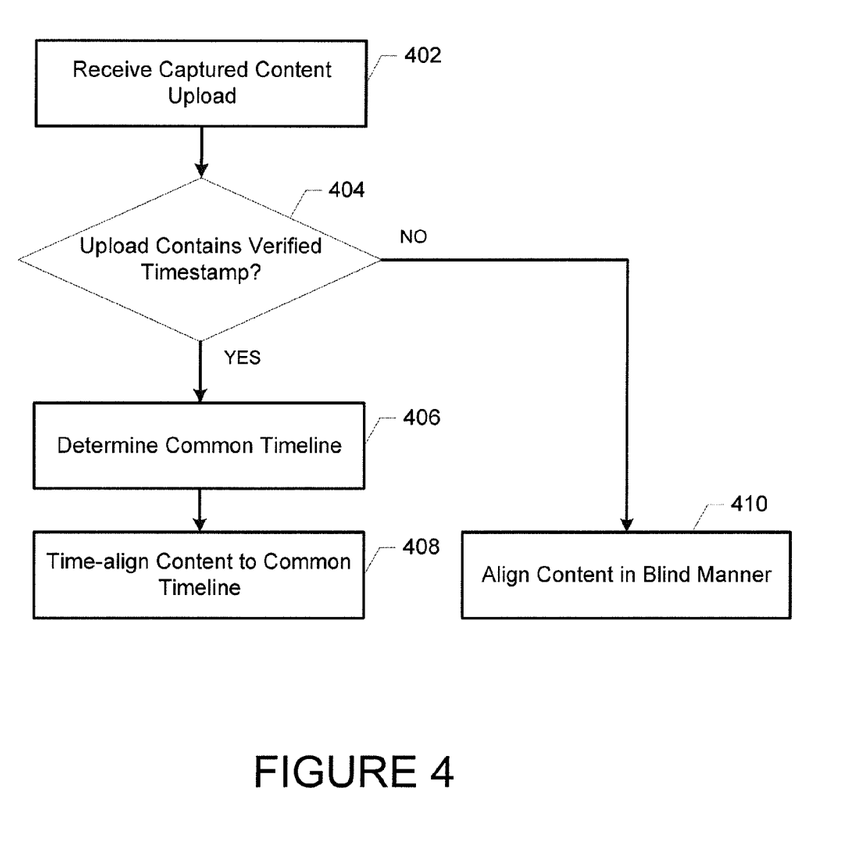
FIG. 4 is a flow chart illustrating operations performed by an apparatus in accordance with an example embodiment of the present invention.

FIG. 4 illustrates operations that may be provided in some embodiments for synchronizing uploaded content prior to rendering content for end users. In this regard, the apparatus embodied by the multi-user content server 106 may include means, such as a processor 202 or the like, for receiving the upload of captured content. See block 402 of FIG. 4. The multi-user content server 106 may also include means, such as a processor 202, memory 204, or the like, for causing storage of the uploaded content.

As shown in block 404 of FIG. 4, the apparatus embodied by the multi-user content server 106 may also include means, such as a processor 202 or the like, for determining whether verified timestamps were uploaded with the captured content.

If the captured content was uploaded with a verified timestamp (block 404, YES), the apparatus embodied by the multi-user content server 106 may also include means, such as a processor 202 or the like, for creating a common timeline for the uploaded multi-user content. See block 406 of FIG. 4. For example, the apparatus may first generate a course timeline using the transmitted timestamps, such as shown by the example timeline of FIG. 5.

As shown in block 408 of FIG. 4, the apparatus embodied by the multi-user content server 106 may also include means, such as a processor 202 or the like, for aligning the uploaded multi-user content to the common timeline. For example, the apparatus may construct the final timeline by time-aligning the uploaded content where the alignment area is determined by the deviation value, cDiff$_x$, or some value derived from the deviation value. In aligning the content, in some embodiments the apparatus may exclude content that does not overlap at all or where the overlapping segment duration is small. For example, the apparatus may exclude content where the overlap duration is less than one second, although various other overlap duration minimum values may be used. Further, in some embodiments, the apparatus may limit the time-alignment window for overlapping content to reduce complexity.

If the captured content was not uploaded with a verified timestamp (block 404, NO), the apparatus embodied by the multi-user content server 106 may also include means, such as a processor 202 or the like, for aligning content by other methods. See block 410 of FIG. 4. For example, the apparatus may perform the alignment of uploaded content in a blind manner where the alignment window cannot be limited in any way, thereby leading to significant increases in computational complexity. If time information is not available, the existence or amount of overlap may not be known, so a full scale analysis of the signals may be required to determine overlap and the signal may need to be analyzed in segments instead of analyzing the entire signal in situations where an overlap may be small in comparison to the signal duration.

Figure 5:
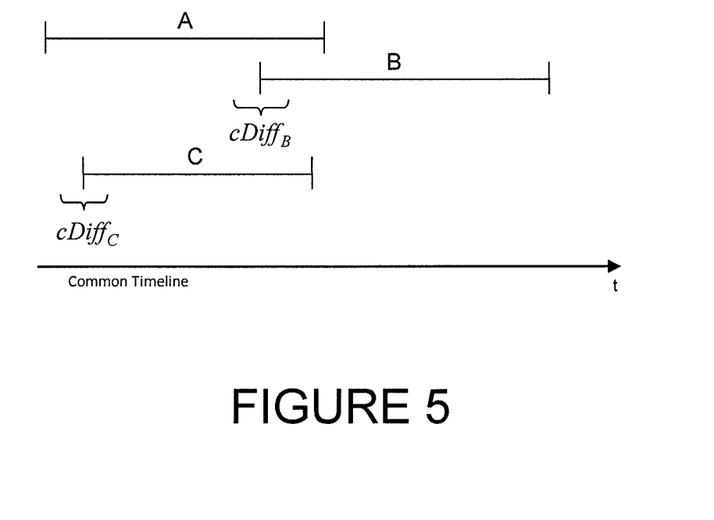
FIG. 5 is a diagram illustrating placement of uploaded content in a common timeline in accordance with an example embodiment of the present invention.

FIG. 5 shows an example of creation of a common timeline and alignment of content, as provided in some embodiments. FIG. 5 illustrates uploaded content comprising overlapping times for content A, content B, and content C. FIG. 5 further illustrates a coarse timeline for the uploaded multi-user content which spans from the beginning of content A through the end of content B. FIG. 5 also shows the deviation in the start time for some of the uploaded content items as indicated by the transmitted deviation values cDiff$_B$ and cDiff$_C$.

The method, apparatus, and computer program product may now be described in conjunction with the operations illustrated in FIG. 6. In this regard, the apparatus 200 may include means, such as the processor 202, the camera/microphone 210, or the like, for causing the start of capture of audio and/or video content of an event. See block 602 of FIG. 6. The apparatus 200 may also include means, such as the processor 202, the clock 214, or the like, for causing the broadcast of a device identifier and a local time associated with the apparatus. See block 604 of FIG. 6. The local time provided in the broadcast is the time when the broadcast message is transmitted to neighboring devices. The apparatus 200 may broadcast messages continuously or at fixed or random intervals.

Figure 6:
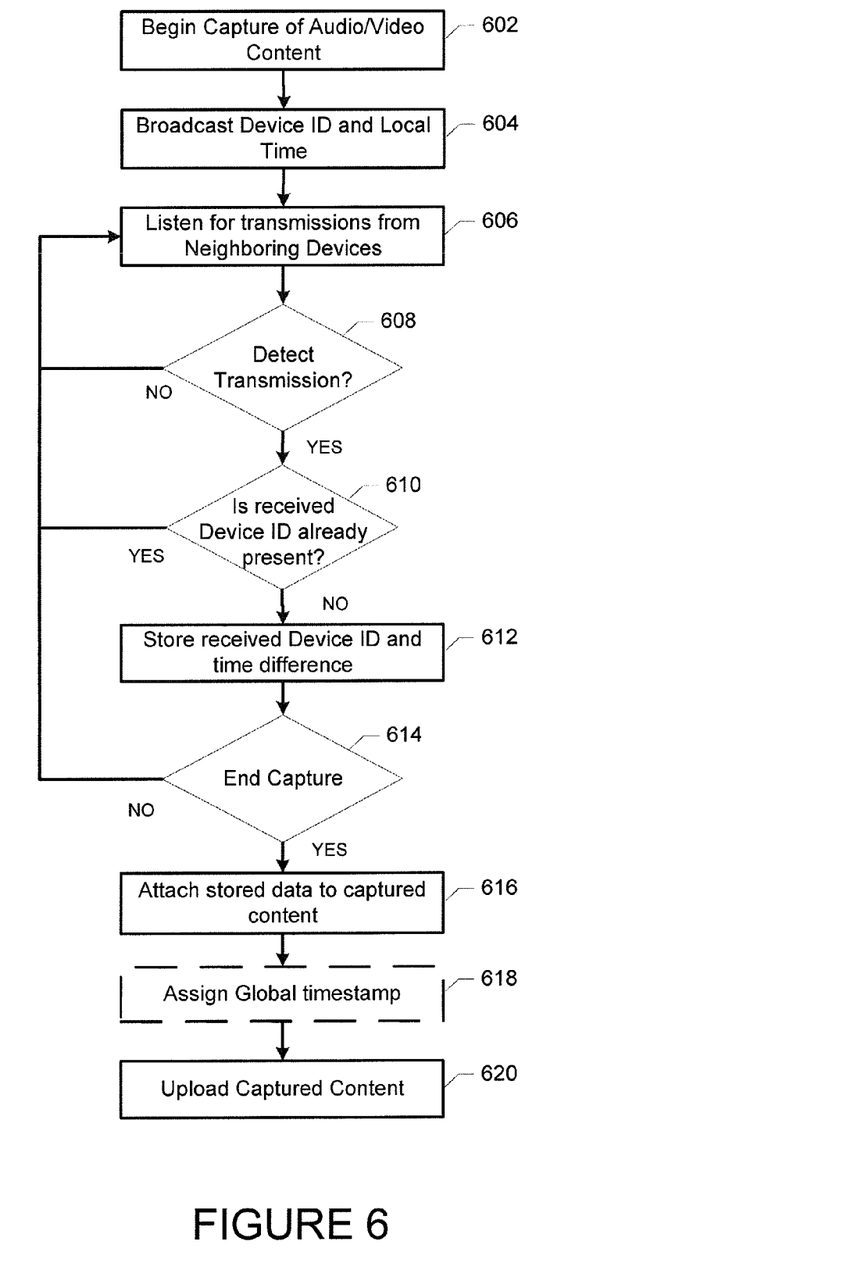
FIG. 6 is a flow chart illustrating operations performed by an apparatus of FIG. 2 that is specifically configured in accordance with another example embodiment of the present invention.

During the capturing of content, as shown in block 606 of FIG. 6, the apparatus 200 may include means, such as the processor 202 or the like, for listening for transmissions of device identifier and time data from other devices (e.g. neighboring mobile devices) which may be capturing content concurrently with apparatus 200. As shown in block 608 of FIG. 6, the apparatus 200 may determine whether a transmission of device identifier and time data has been received. If the apparatus 200 determines a transmission has not been received, the operation returns to block 606 and the apparatus 200 continues to listen for transmissions. If the apparatus 200 determines a transmission has been received, the operation continues to block 610.

As shown in block 610 of FIG. 6, the apparatus 200 may include means, such as the processor 202, the memory 204, or the like, for determining if the received device identifier is already present in stored data stored at the apparatus 200. If the device identifier is already present in the stored data, operation may return to block 606 where apparatus 200 may continue to listen for transmissions. If the apparatus 200 determines that the received device identifier is not present in the stored data, operation may continue to block 612. In an alternative embodiment, the apparatus 200 may not determine whether the received device identifier is already present in the stored data, but rather, may store multiple instances of time difference data for a received device identifier in the stored data.

As shown in block 612 of FIG. 6, the apparatus 200 may also include means, such as the processor 202, or the like, for causing the received device identifier, deviceID$_d$, and time difference data, timeDiffd$_d$, to be stored at the apparatus. The time difference data stored at the apparatus 200 is determined according to timeDiff$_d$=Ts$_{local}$−Ts$_d$, where Ts$_{local}$ represents the local time of the apparatus 200 at the time of receiving the broadcast from device d and $Ts_d$ is the transmitted local time in the broadcast message from device d. In some embodiments, apparatus 200 may periodically broadcast the stored data stored at the apparatus 200.

The apparatus 200 may, for example, broadcast the stored records of device identifier and time difference data. In a further example, if an apparatus receives a broadcast of stored records from a remote device, the apparatus will determine if its device identifier is contained in the received data, and if it is found, the apparatus may use the associated time difference data to determine a correspondence between the time differences of the received records and the apparatus's local time. If the apparatus device identifier is not in the received data but the transmitting device's identifier is contained in the apparatus's stored records, the apparatus may use the associated time difference data to determine the correspondence between the time differences of the received records and the apparatus's local time. The apparatus may then be able to update its stored records with data from the received records, such as by storing device identifiers and time difference data for devices not already contained in the apparatus's stored records.

In a further example, if the apparatus receives stored records from multiple devices, the apparatus may be able to use the correspondence between the records received from the multiple devices to update its stored records. For example, if devices A and B each have each the records of the other and if devices B and C each have the records of the other, device B may be used as a proxy to determine the time difference between devices A and C even if records from device B are not available at the receiving apparatus.

The apparatus 200 may also include means, such as the processor 202 or the like, for determining that content capture has ended. See block 614 of FIG. 6. If the apparatus 200 determines that content capture has not ended, operation returns to block 606 and apparatus continues to listen for transmissions. If the apparatus 200 determines that content capture has ended, operation continues to block 616.

As shown in block 616 of FIG. 6, the apparatus 200 may also include means, such as the processor 202, or the like, for attaching the stored data (e.g. one or more device identifiers and associated time difference data) to the captured content. In an alternative embodiment where multiple broadcasts from a remote device are received and stored at apparatus 200, the time difference data attached to the captured content for a remote device identifier may be the average of the time differences for the multiple broadcasts received during capturing.

As shown in block 618 of FIG. 6, the apparatus 200 may also include means, such as the processor 202, or the like, for optionally assigning a global timestamp to the captured content after capturing has ended, if such a global time source is available.

As shown in block 620 of FIG. 6, the apparatus 200 may also include means, such as the processor 202, or the like, for causing the upload of the captured content, such as to multi-user content server 106.

Figure 7:
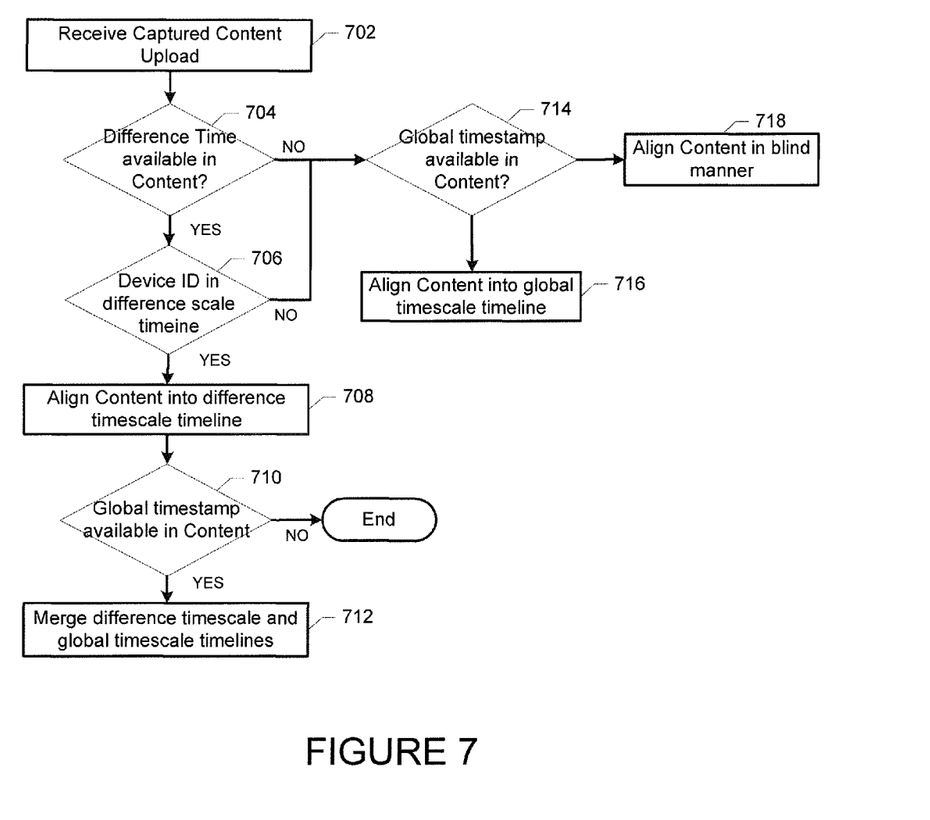
FIG. 7 is a flow chart illustrating operations performed by an apparatus in accordance with a further example embodiment of the present invention.

FIG. 7 illustrates operations that may be provided in some embodiments for synchronizing uploaded content prior to rendering content for end users. In this regard, the apparatus embodied by the multi-user content server 106 may include means, such as a processor 202 or the like, for receiving the upload of captured content. See block 702 of FIG. 7. The multi-user content server 106 may also include means, such as a processor 202, memory 204, or the like, for causing storage of the uploaded content.

As shown in block 704 of FIG. 4, the apparatus embodied by the multi-user content server 106 may also include means, such as a processor 202 or the like, for determining whether time difference data is available for the received content. If the received content has time difference data, the apparatus embodied by the multi-user content server 106 may also include means, such as a processor 202 or the like, for determining whether at least one device identifier associated with the time difference data is already part of a difference timescale timeline that is used to synchronize the uploaded multi-user content. See block 706 of FIG. 7.

If it is determined that at least one device identifier is already part of a difference timescale timeline, the apparatus embodied by the multi-user content server 106 may also include means, such as a processor 202 or the like, for aligning the received content to the difference timescale timeline using at least the time difference data as part of the alignment criteria. See block 708 of FIG. 7. For example, if content D, from deviceID$_D$, is already part of the difference timescale timeline (e.g. common timeline) and deviceID$_D$ is included in the time difference data for the received content, then the time position of the new content (e.g. the received content) is determined according to timePos$_{new}$=timePos$_D$+timeDiff$_D$, where timePos$_D$ is the timeline position of the content D in the difference timescale timeline and timeDiff$_D$ is the time difference data associated with deviceID$_D$ for the received content.

As shown in block 710 of FIG. 7, the apparatus embodied by the multi-user content server 106 may also include means, such as a processor 202 or the like, for optionally determining whether a global timestamp is also available for the received content. If a global timestamp is available for the received content, the apparatus embodied by the multi-user content server 106 may also include means, such as a processor 202 or the like, for optionally merging the difference timescale timeline and a global timeline into a single common timeline for the received multi-user content. See block 712 of FIG. 7. For example, the apparatus embodied by the multi-user content server 106 may generate two timelines for received content, one based on time difference data and one based on global timestamps and these two timelines are then merged once there is data available that describes the relationship between the time difference timeline and the global timeline. In this case, the received content that has a global timestamp and time difference data is used to adjust all the content in the time difference timeline to global time and then the adjusted time difference timeline content is aligned with the global timeline. If it is determined that a global timestamp is not available, the operation ends.

In some embodiments, the stored data attached to the captured content may also include information concerning the accuracy of the time difference data. In a case where the time difference data has been determined a low accuracy during capture, the apparatus embodied by the multi-user content server 106 may also include means, such as a processor 202 or the like, for using the time difference data as a pre-processing step to approximate the time position for the received content on the common timeline and the final alignment may then be completed using traditional time alignment methods which only operate in the vicinity of the approximate time position. For example, the final position is timePos$_{new}$±T, where T is the alignment window size.

If at block 704, it is determined that the received content does not have time difference data available, operation continues to block 714. As shown in block 714 of FIG. 7, the apparatus embodied by the multi-user content server 106 may also include means, such as a processor 202 or the like, for determining whether a global timestamp is available for the received content. If a global timestamp is available for the received content, the apparatus embodied by the multi-user content server 106 may also include means, such as a processor 202 or the like, for aligning the received content to the difference timescale timeline using at least the time difference data as part of the alignment criteria. See block 716 of FIG. 7.

If at block 714, it is determined that the received content does not have a global timestamp available, operation continues to block 718. As shown in block 718 of FIG. 7, the apparatus embodied by the multi-user content server 106 may also include means, such as a processor 202 or the like, for blindly aligning received content that does not have synchronization data, such as by analyzing the content signals.

As described above, FIGS. 3, 4, 6, and 7 illustrate flowcharts of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present invention and executed by a processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the blocks with dashed outlines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining captured content to be shared in a multi-user environment;
   determining a current universal timestamp;
   assigning, by a processor, a calculated timestamp to the captured content, wherein the calculated timestamp is based on the current universal timestamp, a current local timestamp, and a start timestamp of the captured content;
   locating one or more reference content items, each having a verified timestamp;
   verifying, by the processor, the calculated timestamp is valid based on the one or more located reference content items; and
   causing captured content data to be transmitted, wherein if the calculated timestamp is verified as valid the captured content data comprises the captured content and the verified calculated timestamp, and wherein if the calculated timestamp cannot be verified as valid the captured content data otherwise comprises the captured content.

2. A method according to claim 1 wherein the current universal timestamp is based on a Network Time Protocol signal.

3. A method according to claim 1 wherein the current universal timestamp is based on a Global Positioning System signal.

4. A method according to claim 1 wherein the assigning a calculated timestamp comprises determining a difference between the current universal timestamp and the current local timestamp and adding said difference to the start timestamp assigned to the content during capturing.

5. A method according to claim 1 wherein the locating one or more reference content items further comprises searching for reference content items captured within a specified time window around a start timestamp of the captured content.

6. A method according to claim 1 wherein the verifying the calculated timestamp is based on up to a determined number of located reference content items.

7. A method according to claim 1 wherein the verifying the calculated timestamp further comprises:
   calculating a first set of difference values between the calculated timestamp of the determined captured content and of the one or more reference content item verified timestamps;
   calculating a set of second difference values between the start timestamp of the determined captured content and the one or more reference content item start timestamps;

calculating a third set of values comprising absolute values of each of a set of difference values between the set of first difference values and the set of second difference values; and determining that none of the third set of values exceeds a threshold parameter.

8. A method according to claim 1 wherein the captured content data further comprises an indication of the start timestamp deviation for the captured content.

9. An apparatus comprising at least one processor and at least one memory including computer program instructions, the at least one memory and the computer program instructions configured to, with the at least one processor, cause the apparatus at least to:

determine captured content to be shared in a multi-user environment;

determine a current universal timestamp;

assign a calculated timestamp to the captured content, wherein the calculated timestamp is based on the current universal timestamp, a current local timestamp, and a start timestamp of the captured content;

locate one or more reference content items, each having a verified timestamp;

verify the calculated timestamp is valid based on the one or more located reference content items; and cause captured content data to be transmitted, wherein if the calculated timestamp is verified as valid the captured content data comprises the captured content and the verified calculated timestamp, and wherein if the calculated timestamp cannot be verified as valid the captured content data otherwise comprises the captured content.

10. An apparatus according to claim 9 wherein the current universal timestamp is based on a Network Time Protocol signal.

11. An apparatus according to claim 9 wherein the current universal timestamp is based on a Global Positioning System signal.

12. An apparatus according to claim 9 wherein the at least one memory and the computer program instructions are further configured to, with the at least one processor, cause the apparatus to assign a calculated timestamp by at least determining a difference between the current universal timestamp and the current local timestamp and adding said difference to the start timestamp assigned to the content during capturing.

13. An apparatus according to claim 9 wherein the at least one memory and the computer program instructions are further configured to, with the at least one processor, cause the apparatus to locate one or more reference content items further by at least searching for reference content items captured within a specified time window around a start timestamp of the captured content.

14. An apparatus according claim 9 wherein the at least one memory and the computer program instructions are further configured to, with the at least one processor, cause the apparatus to verify the calculated timestamp based on up to a determined number of located reference content items.

15. An apparatus according claim 9 wherein the at least one memory and the computer program instructions are further configured to, with the at least one processor, cause the apparatus to verify the calculated timestamp by at least:

calculating a first set of difference values between the calculated timestamp of the determined captured content and of the one or more reference content item verified timestamps;

calculating a set of second difference values between the start timestamp of the determined captured content and the one or more reference content item start timestamps;

calculating a third set of values comprising absolute values of each of a set of difference values between the set of first difference values and the set of second difference values; and determining that none of the third set of values exceeds a threshold parameter.

* * * * *